US008113039B2

(12) United States Patent
Beetz et al.

(10) Patent No.: US 8,113,039 B2
(45) Date of Patent: Feb. 14, 2012

(54) METHOD FOR TESTING THE OPERATION OF A PRESSURE SENSING UNIT OF AN INJECTION SYSTEM OF AN INTERNAL COMBUSTION ENGINE

(75) Inventors: Christian Beetz, Erlangen (DE); Michael Wirkowski, Regensburg (DE); Hartmut Wolpert, Zeitlarn (DE)

(73) Assignee: Continental Automotive GmbH, Hannover (DE)

( * ) Notice: Subject to any disclaimer, the term of this patent is extended or adjusted under 35 U.S.C. 154(b) by 172 days.

(21) Appl. No.: 12/514,849

(22) PCT Filed: Nov. 13, 2007

(86) PCT No.: PCT/EP2007/062284

§ 371 (c)(1), (2), (4) Date: Nov. 24, 2009

(87) PCT Pub. No.: WO2008/058969

PCT Pub. Date: May 22, 2008

(65) Prior Publication Data

US 2010/0083742 A1 Apr. 8, 2010

(30) Foreign Application Priority Data

Nov. 15, 2006 (DE) ......................... 10 2006 053 950

(51) Int. Cl.
*G01M 15/04* (2006.01)

(52) U.S. Cl. ................................. 73/114.51; 73/114.43

(58) Field of Classification Search ............... 73/114.43, 73/114.51

See application file for complete search history.

(56) References Cited

U.S. PATENT DOCUMENTS

| | | | | | |
|---|---|---|---|---|---|
| 5,727,515 | A * | 3/1998 | Biester | ...................... | 123/198 D |
| 5,983,714 | A * | 11/1999 | Izumiura et al. | ........... | 73/114.43 |
| 6,234,148 | B1 | 5/2001 | Birkner et al. | | |
| 6,802,209 | B2 * | 10/2004 | Joos et al. | .................. | 73/114.43 |
| 6,947,831 | B2 * | 9/2005 | van Nieuwstadt | ............ | 701/114 |
| 7,121,265 | B2 * | 10/2006 | Joos et al. | ..................... | 123/494 |
| 7,171,952 | B2 * | 2/2007 | Joos et al. | ..................... | 123/457 |
| 7,360,408 | B2 * | 4/2008 | Dingler et al. | ............. | 73/118.01 |
| 7,590,482 | B2 * | 9/2009 | Watanabe | ..................... | 701/103 |
| 7,706,962 | B2 * | 4/2010 | Fushiki et al. | ................ | 701/114 |
| 7,854,160 | B2 * | 12/2010 | Elkolaly | .................... | 73/114.43 |
| 2005/0005912 | A1 * | 1/2005 | Joos et al. | ..................... | 123/458 |

FOREIGN PATENT DOCUMENTS

| | | | |
|---|---|---|---|
| DE | 19937962 | A1 | 2/2001 |
| EP | 1526269 | A2 | 4/2005 |
| WO | WO 9934187 | A1 | 7/1999 |
| WO | WO 0181746 | A1 | 11/2001 |

OTHER PUBLICATIONS

International PCT Search Report, PCT/EP2007/062284, 12 pages, Mar. 27, 2008.

German Office Action, German application No. 10 2006 053 950.8-13, 2 pages, Jul. 20, 2007.

* cited by examiner

*Primary Examiner* — Freddie Kirkland, III
(74) *Attorney, Agent, or Firm* — King & Spalding L.L.P.

(57) ABSTRACT

In a method for testing the operation of a pressure sensing unit of an injection system of an internal combustion engine, the injection system has no high-pressure valve. An error is detected when a pressure gradient value falls below a pressure gradient limit while at the same time the most recently detected pressure is higher than a pressure limit.

15 Claims, 2 Drawing Sheets

Figure 1:
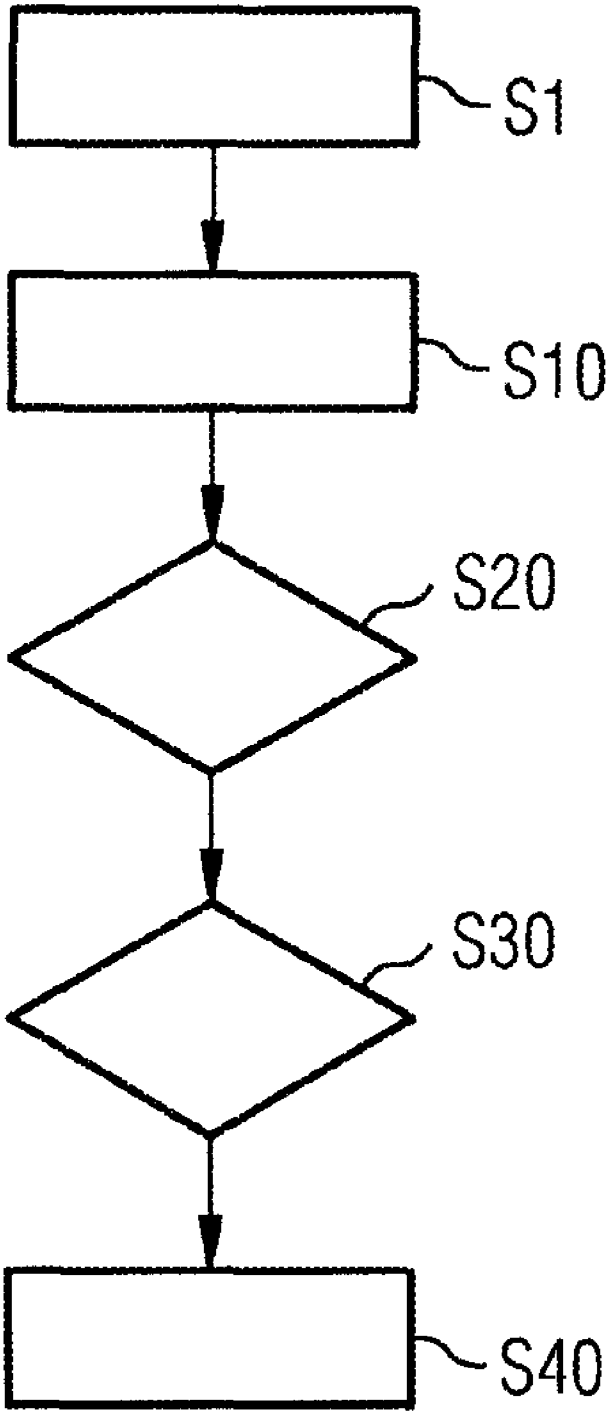

METHOD FOR TESTING THE OPERATION OF A PRESSURE SENSING UNIT OF AN INJECTION SYSTEM OF AN INTERNAL COMBUSTION ENGINE

The invention relates to a method for testing the operation of a pressure sensing unit of an injection system of an internal combustion engine according to the features of the preamble of main claim 1.

Fuel injection apparatuses for operating an internal combustion engine have generally been known for some years. With a so-called common rail injection system, the fuel is supplied to the respective combustion chamber of the internal combustion engine through injectors. A high injection pressure is advantageous here, since a high specific output of the internal combustion engine on the one hand and a low emission of pollutants on the other hand can be achieved. When using a high pressure pump and an accumulator (rail) for the fuel, injection pressures of 1600 to 1800 bar can be achieved. As a result of the high injection pressures, high demands are thus also placed on the safety engineering and the components thereof. The operation of a pressure sensing unit provided for an internal engine is usually tested by the internal combustion engine being switched off and the rail pressure continually reducing with the switch-off process being considered. As both injection systems with a high pressure control valve and also without a high pressure control valve are used, different operation testing methods must therefore be used in each instance.

Methods are known from the prior art, in which the injection system has a high pressure control valve. The operational capability of a pressure sensing unit with a switched-off internal combustion engine takes place by monitoring the rail pressure. The pressure in an injection system with a high pressure control valve is released by opening the high pressure valve, after the internal combustion engine has been switched off. The pressure drop takes place very quickly here so that it is possible after a very brief predeterminable time to determine whether the pressure sensing unit functions efficiently. To this end, account is taken into whether the pressure value determined after the pressure drop is above a predetermined limit value after a predetermined time.

With injection systems in which no high pressure control valve is used, the rail pressure drop by contrast takes place only very slowly (e.g. by means of leakage losses). The rail pressure drop can even last longer in this case than the control device is powered. As the operation testing method of the pressure sensing unit is however a fundamental element of the control device, no statement as to the operational capability of a pressure sensing unit can be made after cutting off the power to the control device.

The object underlying the present invention now consists in providing a method, which, during the use of an injection system without a high pressure control valve, allows the operational state of a pressure sensing unit to be determined.

This object is achieved according to the invention by the features of claim 1. Advantageous configurations of the invention are identified in the subclaims.

The advantages achieved with the invention consist in particular in a method being available for injection systems without a high pressure valve for determining the operational capability of a pressure sensing unit. In particular, the method determines the operational capability of the pressure sensing unit in the case of a slow rail pressure loss.

Figure 2:
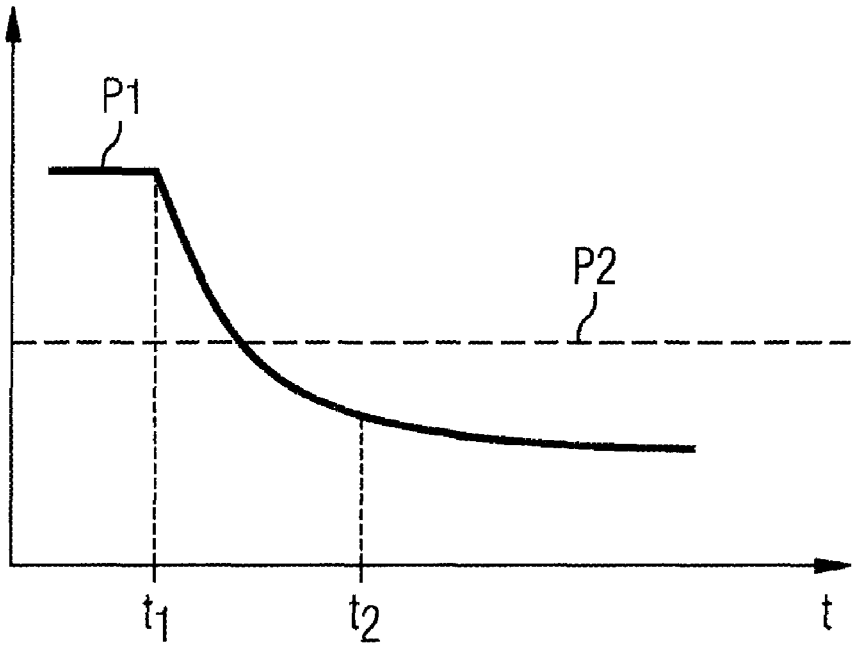
Figure 3:
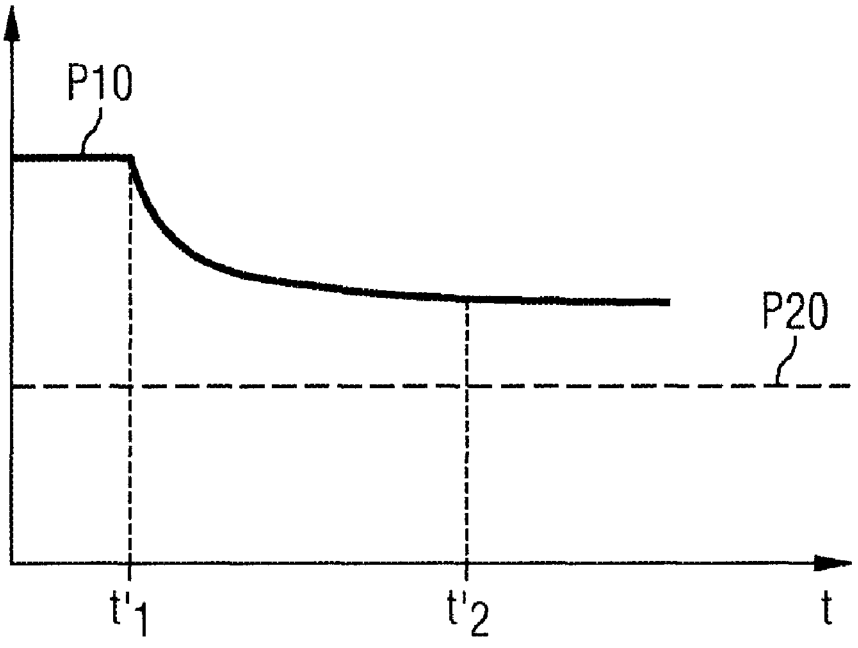

Particulars of the invention are described in more detail with reference to the drawing, in which:

FIG. 1 shows a flow chart to determine the operational state of the pressure sensing unit FIG. 2 shows the temporal rail pressure curve for the case that no failure is identified in the pressure sensing unit, FIG. 3 show the temporal rail pressure curve for the case that a failure is identified in the pressure sensing unit.

FIG. 1 shows a flow chart to determine the operational state of the pressure sensing unit. The internal combustion engine is switched off in step S1. Pressure values are then continuously determined in step S10 and the respective pressure gradients are determined based hereupon with the aid of two consecutive pressure values. The time span between determining these two pressure values, which are needed to determine the pressure gradients, is predefinable. It is determined in step S20 whether the predetermined pressure gradient exceeds a stored pressure gradient limit value. For the case that the determined pressure gradient exceeds this pressure gradient limit value, it is assumed that the pressure normally drops via a leakage. The operational test of the pressure sensing unit is then not pursued further. If the pressure gradient does not achieve the stored pressure gradient limit value, step S30 checks whether the pressure value determined at the second instant is greater than a stored pressure limit value. If the pressure value determined at the second instant is greater than the stored pressure limit value, corresponding measures are introduced in step S40. It has proven particularly advantageous for the pressure value determined at the second instant to correspond to the pressure value determined last.

The operational test of the pressure sensing unit can also take place prior to the next engine start. This is particularly necessary if the operational test is subsequently not active in some circumstances, because the condition that the pressure gradient value is smaller than a stored pressure gradient limit value is not identified before the control device switches off. As the operational test is an integral part of the control device, this can also only function when the control device is being powered. Subsequently is understood to mean that the engine control device also implements functions for a certain period of time after the internal combustion engine has been cut off.

With a longer idle time of the internal combustion engine, the rail pressure is dissipated completely. The pressure gradient value is then automatically smaller than a stored pressure gradient limit value, so that the fault diagnosis can be implemented immediately when the internal combustion engine is switched on and the last determined pressure can thus be compared with the stored second limit value.

FIG. 2 shows the temporal rail pressure curve 1 for the case that no failure is identified in the case of the pressure sensing unit. The dashed line corresponds here to the temporal curve of the stored pressure limit value P2 for determining the operational capability of the pressure sensing unit. The internal combustion engine is cut off at instant t1. From this time, the rail pressure curve P1 drops. Until instant t2, the pressure gradient curve is above a stored pressure gradient limit value, with both curves not being shown in the diagram. Only after instant t2 does the pressure gradient curve drop below the stored pressure gradient limit value and a value comparison is carried out between the rail pressure P1 determined at the second instant and the stored pressure limit value P2. The result shows that the rail pressure P1 at instant t2 is below the stored pressure limit value P2 and the pressure sensing unit is not faulty.

FIG. 3 shows the temporal rail pressure curve P10 for the case that a failure is identified in the pressure sensing unit. The dashed line corresponds here to the temporal curve of the stored pressure limit value P20 for determining the operational capability of the pressure sensing unit. The internal combustion engine is cut off at instant t1'. The rail pressure curve P10 drops after this time. The pressure gradient curve is above a stored pressure gradient limit value up until instant t2', with both curves not being shown in the diagram. Only after instant t2 does the pressure gradient curve drop below the stored pressure gradient limit value and a value comparison is carried out between the last determined rail pressure P10 and the stored pressure limit value P20. As the rail pressure P10 is above the stored pressure limit value P20, an error is identified in the pressure sensing unit.

The invention claimed is:

1. A method for testing the operation of a pressure sensing unit in an injection system of an internal combustion engine which does not comprise a high pressure control valve, the method comprising the steps of:

immediately after switching off the internal combustion engine, continuously measuring pressure values, wherein pressure gradients are determined between two consecutive pressure measurements, comparing a determined pressure gradient with a stored pressure gradient limit value and when the pressure gradient falls below this pressure gradient limit value, comparing a second pressure value of said two consecutive pressure measurements with a stored pressure limit value and signaling a failure if the second pressure value exceeds the stored pressure limit value.

2. The method according to claim 1, wherein if the pressure gradient exceeds the stored pressure gradient limit value, no comparison of the last determined pressure value with the stored pressure limit value is implemented.

3. The method according to claim 1, wherein the time span between the two consecutive pressure measurements can be predetermined for determining the pressure gradients.

4. The method according to claim 1, wherein an operational test of the pressure sensing unit is repeated when the internal combustion engine is started again, if the operational test after the internal combustion engine has switched off cannot be implemented as a result of the powering of the control device being too brief.

5. The method according to claim 1, wherein the injection system is a common rail injection system.

6. A system for testing the operation of a pressure sensing unit in an injection system of an internal combustion engine which does not comprise a high pressure control valve, the system being operable, immediately after switching off the internal combustion engine, to continuously measure pressure values, wherein pressure gradients are determined between two consecutive pressure measurements, to compare a determined pressure gradient with a stored pressure gradient limit value and, when the pressure gradient falls below this pressure gradient limit value, to compare a second pressure value of said two consecutive pressure measurements with a stored pressure limit value and to signal a failure if the second pressure value exceeds the stored pressure limit value.

7. The system according to claim 6, wherein if the pressure gradient exceeds the stored pressure gradient limit value, no comparison of the last determined pressure value with the stored pressure limit value is implemented.

8. The system according to claim 6, wherein the time span between the two consecutive pressure measurements can be predetermined for determining the pressure gradients.

9. The system according to claim 6, wherein an operational test of the pressure sensing unit is repeated when the internal combustion engine is started again, if the operational test after the internal combustion engine has switched off cannot be implemented as a result of the powering of the control device being too brief.

10. The system according to claim 6, wherein the injection system is a common rail injection system.

11. A system for testing the operation of a pressure sensing unit in an injection system of an internal combustion engine which does not comprise a high pressure control valve, comprising a control device operable, immediately after switching off the internal combustion engine, to continuously determine a pressure gradient from two sequential pressure measurements, to compare the pressure gradient with a stored pressure gradient limit value and, when the pressure gradient falls below this pressure gradient limit value, to compare a second pressure value of the two sequential pressure measurements with a stored pressure limit value and to signal a failure if the second pressure value exceeds the stored pressure limit value.

12. The system according to claim 11, wherein if the pressure gradient exceeds the stored pressure gradient limit value, no comparison of the last determined pressure value with the stored pressure limit value is implemented.

13. The system according to claim 11, wherein the time span between the two sequential pressure measurements can be predetermined for determining the pressure gradients.

14. The system according to claim 11, wherein an operational test of the pressure sensing unit is repeated when the internal combustion engine is started again, if the operational test after the internal combustion engine has switched off cannot be implemented as a result of the powering of the control device being too brief.

15. The system according to claim 11, wherein the injection system is a common rail injection system.

* * * * *